(12) United States Patent
Xiong et al.

(10) Patent No.: US 8,882,981 B2
(45) Date of Patent: Nov. 11, 2014

(54) SUPER-CAPACITOR DESALINATION DEVICES AND METHODS

(76) Inventors: Rihua Xiong, Shanghai (CN); Hai Yang, Shanghai (CN); Wei Cai, Shanghai (CN)

(*) Notice: Subject to any disclaimer, the term of this patent is extended or adjusted under 35 U.S.C. 154(b) by 641 days.

(21) Appl. No.: 13/033,625

(22) Filed: Feb. 24, 2011

(65) Prior Publication Data

US 2012/0037511 A1    Feb. 16, 2012

(30) Foreign Application Priority Data

Aug. 10, 2010   (CN) .......................... 2010 1 0252556

(51) Int. Cl.
| | | |
|---|---|---|
| C02F 1/46 | (2006.01) | |
| C02F 1/469 | (2006.01) | |
| C02F 1/461 | (2006.01) | |
| C02F 1/42 | (2006.01) | |

(52) U.S. Cl.
CPC ............. *C02F 1/4604* (2013.01); *C02F 1/4691* (2013.01); *C02F 2001/46128* (2013.01); *C02F 2001/46138* (2013.01); *C02F 2201/4618* (2013.01); *C02F 1/46109* (2013.01); *C02F 1/42* (2013.01)
USPC .......................................... 204/520; 204/630

(58) Field of Classification Search
CPC ....... B01D 57/02; C02F 1/469; C02F 1/4604; C02F 1/4691; C02F 2001/46; C02F 1/46; H01G 9/145; H01G 9/155
USPC ................ 204/290.01–290.15, 520, 630, 632
See application file for complete search history.

(56) References Cited

U.S. PATENT DOCUMENTS

| | | | | |
|---|---|---|---|---|
| 5,017,274 A | * | 5/1991 | Kerr et al. ...................... | 205/635 |
| 5,074,988 A | * | 12/1991 | Nyberg et al. ................ | 204/418 |
| 2002/0167782 A1 | * | 11/2002 | Andelman et al. ............ | 361/302 |
| 2006/0091013 A1 | | 5/2006 | Takahashi et al. | |
| 2008/0144256 A1 | | 6/2008 | Cai et al. | |

FOREIGN PATENT DOCUMENTS

| | | |
|---|---|---|
| CN | 101563296 A | 10/2009 |
| EP | 0760805 B1 | 1/2008 |
| WO | 2007115530 A1 | 10/2007 |
| WO | 2008094367 A1 | 7/2008 |
| WO | 2009062872 A1 | 5/2009 |

OTHER PUBLICATIONS

English translation of Office Action dated Mar. 21, 2013 issued on Chinese Application No. 201010252556.1.
Search Report issued in relation to Chinese Application No. 201010252556.1, Jan. 10, 2013.

* cited by examiner

*Primary Examiner* — Keith Hendricks
*Assistant Examiner* — Steven A. Friday
(74) *Attorney, Agent, or Firm* — GE Global Patent Operation (57) ABSTRACT

A super-capacitor desalination device is described and includes a pair of terminal electrodes and at least one bipolar electrode located between the terminal electrodes. The at least one bipolar electrode has an ion exchange material disposed on opposing surfaces thereof The ion exchange material is a cation exchange material or an anion exchange material. A method for super-capacitor desalination is also provided.

7 Claims, 6 Drawing Sheets

SUPER-CAPACITOR DESALINATION DEVICES AND METHODS

BACKGROUND

The disclosure generally relates to a desalination technology, and more particularly to super-capacitor desalination (SCD) devices and methods.

One conventional SCD device generally has a pair of terminal electrodes supplied with opposite polarities for generating an electric field therebetween. A chamber between the terminal electrodes allows a feed stream to be treated to pass through. One or more bipolar electrodes may also be employed between the terminal electrodes for forming more chambers to multiple feed streams.

The conventional SCD device is periodically operated in a charge mode and a discharge mode due to the capacity limitation. In the charge mode, the chambers function as dilute chambers where ions in the feed streams are absorbed onto the electrodes under the electric field to produce dilute solution. When the capacity of the electrodes (terminal electrodes or the bipolar electrodes) is full or nearly full, the conventional SCD device is switched into the discharge mode by shorting the terminal electrodes. Accordingly, the dilute chambers are changed into concentrated chambers where ions in the electrodes enter into the feed streams to produce concentrated solution. With such configuration and operation mode, neither the dilute solution nor the concentrated solution can be produced continuously.

Further, another conventional SCD device additionally employs an energy recovery (ER) device to gather energy generated at the discharge mode. The gathered energy is reused by another SCD device in the charge mode, which decreases overall power consumption but causes higher production cost due to the extra ER device. Furthermore, the ER device consumes some gathered energy due to its own resistance.

Therefore, there is a need to provide improved SCD devices and methods that can provide product water in a continuous way. Further, there is another need to provide SCD devices that can gather energy generated in the discharge mode without an ER device.

BRIEF DESCRIPTION

In accordance with one embodiment, a super-capacitor desalination (SCD) device comprises a pair of terminal electrodes and at least one bipolar electrode located between the terminal electrodes. The at least one bipolar electrode has an ion exchange material disposed on opposing surfaces thereof The ion exchange material is a cation exchange material or an anion exchange material.

In accordance with another embodiment, a SCD system comprises a power source and a SCD device coupled to the power source. The SCD device comprises a pair of terminal electrodes supplied with opposite polarities by the power source to generate an electric field therebetween; at least one bipolar electrode located between the terminal electrodes; and a plurality of chambers formed between the terminal electrodes and the at least one bipolar electrode for allowing feed streams to be treated to pass through. The at least one bipolar electrode has an ion exchange material disposed on opposing surfaces thereof The ion exchange material is a cation exchange material or an anion exchange material.

In accordance with a further embodiment, a SCD system comprises a power source and a plurality of SCD stacks. The SCD stacks comprise a plurality of single electrodes comprising a first single electrode pair coupled to the power source and at least one second single electrode pair located between the first single electrode pair; and a plurality of chambers formed between the first single electrode pair and the at least one second single electrode pair for allowing feed streams to be treated to pass through. The at least one second single electrode pair is formed by electrically connecting two adjacent single electrodes in different SCD stacks in series. The at least one second single electrode is configured to have an ion exchange material on opposing surfaces of the two adjacent single electrodes. The ion exchange material is a cation exchange material or an anion exchange material.

In accordance with a yet further embodiment, a method for super-capacitor desalination comprises providing a SCD device comprising a pair of terminal electrodes, at least one bipolar electrode between the terminal electrodes and a plurality of chambers formed between the terminal electrodes and the at least one bipolar electrode, the at least one bipolar having an ion exchange material disposed on opposing surfaces thereof, the ion exchange material being a cation exchange material or an anion exchange material; supplying opposite polarities to the terminal electrodes to generate an electric field therebetween; introducing a plurality of feed streams into the chambers; simultaneously producing at least one dilute solution in a first chamber and at least one concentrated solution in a second chamber; periodically reversing the opposite polarities to the terminal electrodes; and periodically switching the introduced feed streams for continuously producing the at least one dilute solution in the second chamber and the at least one concentrated solution in the first chamber.

These and other advantages and features will be further understood from the following detailed description of embodiments of the invention that are provided in connection with the accompanying drawings.

DETAILED DESCRIPTION

Embodiments of the present disclosure will be described herein with reference to the accompanying drawings. In the following description, well-known functions or constructions are not described in detail to avoid obscuring the disclosure in unnecessary detail.

Figure 1:
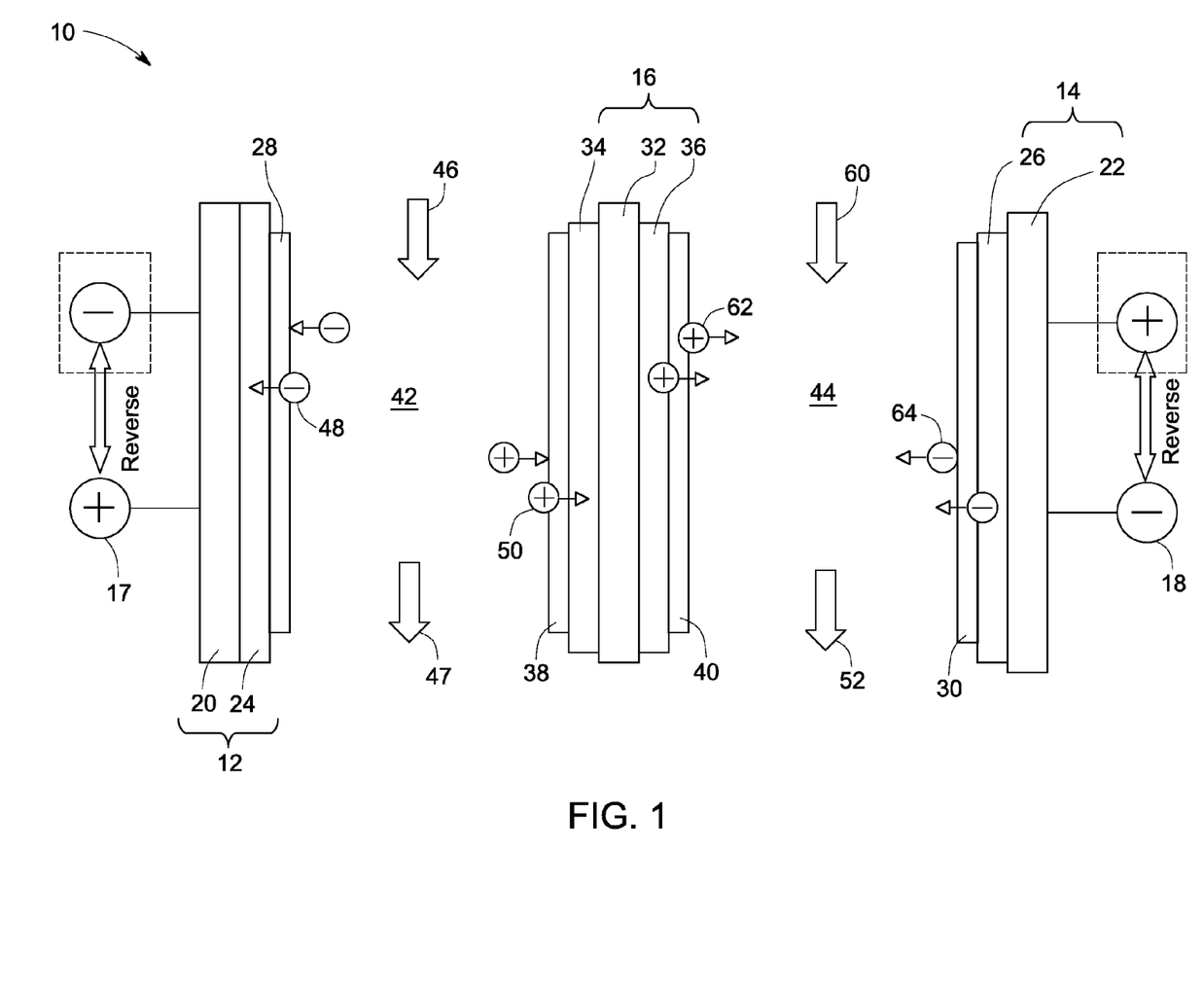
FIG. 1 is a schematic diagram of a SCD device in accordance with one embodiment.

FIG. 1 illustrates a SCD device 10 in accordance with one embodiment. The SCD device 10 includes a pair of terminal electrodes 12 and 14 and a bipolar electrode 16 between the two terminal electrodes 12 and 14. In an operation according to one example, the two terminal electrodes 12 and 14 are supplied with opposite polarities supplied by a power source (not shown) to generate an electric field therebetween.

It should be noted that the term "terminal electrodes" means electrodes to be connected with a power source to produce an electric field for water treatment, but is not limited to any particular structure. The term "bipolar electrode" indicates an electrode having opposing surfaces of which are configured to absorb or desorb ions under an electric field. The bipolar electrode is not limited to a single part, and also may be formed by two single electrodes electrically connected in series.

In the example of FIG. 1, each of the two terminal electrodes 12 and 14 includes a current collector 20, 22 directly linked with the power source, respectively, and a porous layer 24, 26 absorbing and desorbing ions. The porous layer 24, 26 may be made of various materials including but not limited to carbon, activated carbon (AC), graphite, porous carbon particles, carbon aero-gel or any combination thereof. In one embodiment, the terminal electrodes 12 and 14 each further include an ion exchange material. The ion exchange material may be an anion exchange material or a cation exchange material. In one embodiment, the ion exchange material is configured to allow one category of charged ions (anions or cations) to pass through, and block another category of charged ions (cations or anions).

In one example, the anion exchange material allows anions to pass through and block cations while the cation exchange material allows cations to pass through and block anions. Examples of anions may include but are not limited to chlorine ion, sulphate ion, carbonate ion, bicarbonate ion and hydroxide ion. Examples of cations may include but are not limited to sodium ion, calcium ion, magnesium ion, potassium ion, and proton ion. In the example of FIG. 1, the ion exchange materials on the terminal electrodes 12 and 14 are anion exchange materials 28 and 30 that are configured to allow anions to pass through and block cations.

The bipolar electrode 16 according to one embodiment includes a conductive layer 32, a pair of porous layers 34 and 36 on opposing sides of the conductive layer 32 and cation exchange materials 38 and 40 disposed on opposing surfaces of the porous layers 34 and 36. The conductive layer 32 isolates the porous layers 34 and 36 and is configured to allow electrons to transfer from one porous layer to the other porous layer and block ions to pass through. Examples of conductive layers include but are not limited to conductive polymeric film, graphite plate, metal film/plate and conductive ceramic film. An anion exchange material may replace the cation exchange material 38, 40 when each of the terminal electrodes 12 and 14 is provided with a cation exchange material.

The SCD device 10 is alternately operated in a first phase and a second phase by periodically reversing the opposite polarities due to the limited capacity of the cation or anion exchange materials 28, 38, 40 and 30 and the electrodes 12, 14 and 16. The power source may be configured to automatically switch the opposite polarities and also may define an element to periodically switch the opposite polarities according to a predetermined interval. In this example, the durations of the first phase and second phase are same. The durations may be adjusted according to many factors such as the capacity of the ion exchange materials and the electrodes, the size of the SCD device 10 and characteristics of the feed streams.

Referring to FIG. 1, in the first phase, an anode of the power source is coupled to the terminal electrode 12, and a cathode of the power source is coupled to the terminal electrode 14, thereby forming an electric field in the SCD device 10. A first feed stream 46 flows through a chamber 42 formed between the terminal electrode 12 and the bipolar electrode 16, anions 48 in the first feed stream 46 are attracted to move towards the terminal electrode 12 and cations 50 in the first feed stream 46 are attracted to move towards one surface of the bipolar electrode 16 under the electric field.

According to one example, the anions 48 are absorbed onto the anion exchange material 28 and the associated porous layer 24, the cations 50 are absorbed onto the cation exchange material 38 and the associated porous layer 34. The first feed stream 46 becomes a dilute solution 47 as the cations 50 and the anions 48 leave the first feed stream 46 leading to the lower concentration than before. During the treatment of the first feed stream 46, the chamber 42 functions as a dilute chamber in the first phase. Furthermore, in this example, the capabilities of the porous layers 24 and 34 and the ion exchange materials 28 and 34 are both effectively utilized, which expands the applications of the SCD device 10 such as enabling higher current applied on the SCD device 10. Therefore, in some applications, SCD device 10 is used for treating high Total Dissolved Solids (TDS) feed water. TDS refers to the total amount of all inorganic and organic substances including minerals, salts, metals, cations or anions in the feed stream.

During the treatment of the first feed stream 46, a second feed stream 60 is separately treated in another chamber 44 formed by the terminal electrode 14 and the bipolar electrode 16 and becomes a concentrated solution 52 discharged out of the chamber 44. In the chamber 44, anions (not shown) in the second feed stream 60 are attracted to move towards another surface (right surface) of the bipolar electrode 16. However, the cation exchange material 40 blocks anions to have further movement in this example. Instead cations 62 in the cation exchange material 40 or/and the porous layer 36 come into the second feed stream 60 under the electric field. Furthermore, the cations 62 may not enter into the terminal electrode 14 either due to the blockage of the anion exchange material 30 such that the cations 62 are left in the second feed stream 60.

On the other hand, anions 64 in the anion exchange material 30 or/and the porous layer 26 are depleted and pushed out to the second feed stream 60. The anions 64 and the cations 62 come into the second feed stream 60 to form the concentrated solution 52, so the chamber 44 functions as a concentrated chamber in the first phase.

In one embodiment, the anion exchange materials 28, 30 and the cation exchange materials 38, 40 are configured to have the similar capacities as the associated porous layers 24, 34, 36, 26.

It can be seen from the above description that the charge mode (dilute) and the discharge mode (concentrated) co-exist in the single SCD device 10 and the dilute solution 47 and the concentrated solution 52 are simultaneously produced. It is understood for the skilled in this art the operation of the SCD device 10 in the second phase is opposite to that in the first phase. In the second phase, the chamber 42 is changed into a concentrated chamber, and the feed stream becomes a concentrated solution after passing through the chamber 42. The chamber 44 functions as a dilute chamber for outputting the dilute solution. Although the SCD device 10 is alternately operated in the first phase and the second phase, the dilute solution and the concentrated solution may be continuously produced since the charge mode and discharge mode co-exist in both the first phase and the second phase. Furthermore, the absorbed ions in the first phase may be released in the second phase such that the production efficiency is improved because of no extra time used for recovering the absorbing capacity of the electrodes.

In one embodiment, the SCD device 10 further includes flow spacers (not shown) respectively disposed in the chambers 42 and 44 as shown in FIG. 1. The flow spacers are configured to be conductively insulated and allow ions to pass through. The flow spacers are used to secure the electrodes in position under the electric field.

In the first phase shown in FIG. 1, the chamber 44 is operated in the discharge mode, and the cations 62 are desorbed to enter into the second feed stream 60. The electrons originally matched with the cations 62 pass through the conductive layer 32 to be gathered and reused by the chamber 42 that is operated in the charge mode to match with cations 50. The SCD device 10 operates in the charge mode and in the discharge mode at the same time, which realizes in-situ energy recovery without employing any extra energy recovery device.

It should be noted that the ion exchange material in the foregoing and following embodiments such as 28, 30, 38 and 40 may be in various forms such as layer, film, membrane and particles. For example, the ion exchange material 28, 30, 38 or 40 is disposed in at least one layer that is coated on the surface of the associated electrodes. In another embodiment, the ion exchange material is disposed in a plurality of particles that are at least partially distributed within the electrodes. The particles may be implanted into or/and deposited on the surface of the corresponding electrodes. In still another embodiment, the ion exchange material is partially embedded within the electrodes such as 12, 14 and 16 and other portion functions as a membrane on the surface of the electrodes 12, 14 and 16.

Figure 2:
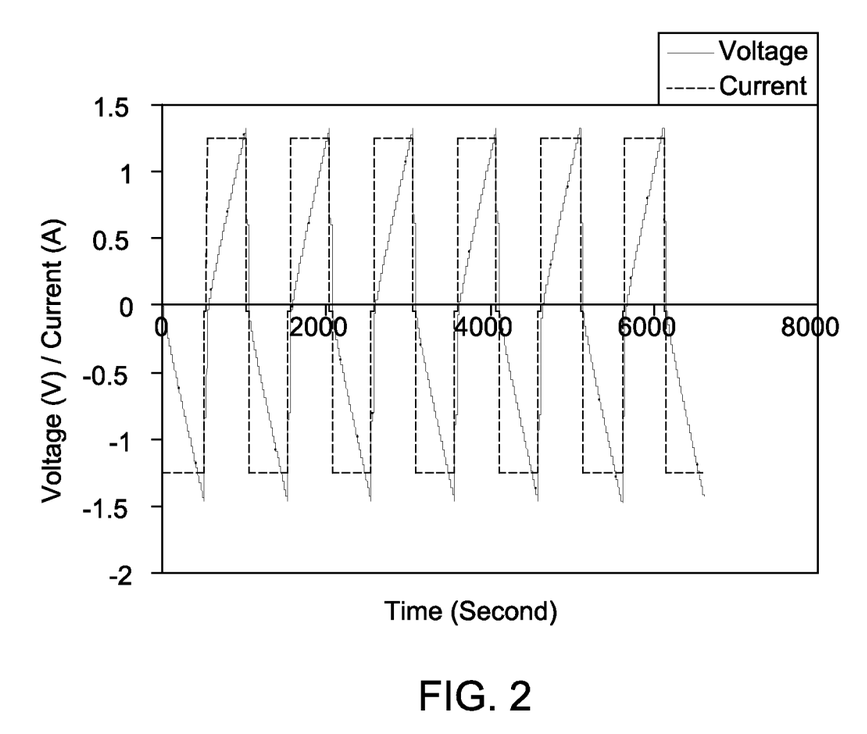
FIG. 2 is a charge curve of a SCD device between 0~6500 seconds during operation in accordance with another embodiment.

In one example, the SCD device 10 is used for treating a solution containing about 800 parts per million (ppm) sodium chloride (NaCl). The solution is divided into two streams functioning as the first and second feed streams 46 and 60 to be respectively introduced into the chambers 42 and 44 that are dilute chamber and concentrated chamber in the first phase shown in FIG. 1. The flow rates of the steams are 780 ml per minutes. In operation, the SCD device 10 is supplied with opposite polarities and periodically charged with a constant current of −1.25 A for 8 minutes in the first phase and 1.25 A for 8 minutes in the second phase. There are around 30 seconds assigned for the switch between the first phase and the second phase. In this example, the current is base parameter for controlling the SCD device 10 operated in a stable electric field, while the voltage is measured based on the constant current. A charge curve of the SCD device 10 between 0~6500 seconds is shown in FIG. 2, and the SCD device 10 experiences the first phases 7 times and the second phases six times during this period.

Figure 3:
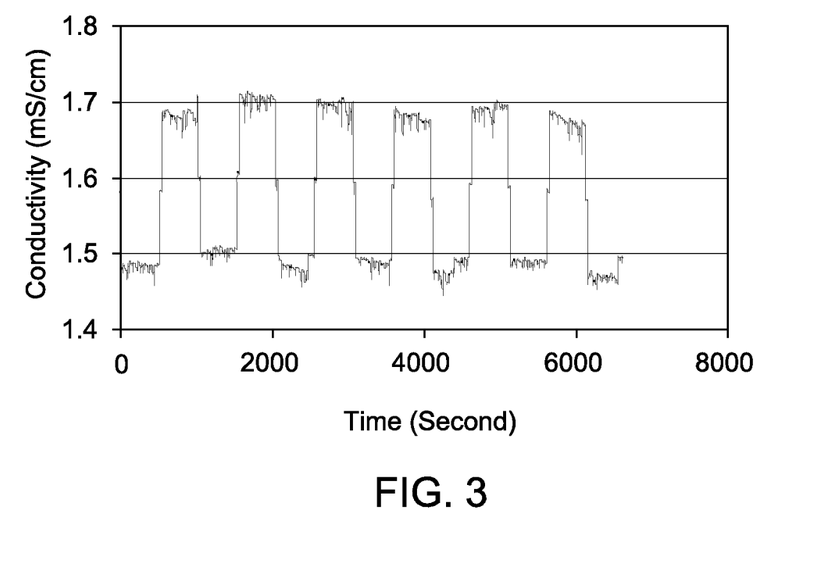
FIG. 3 is a conductivity curve of an output from a chamber in the SCD device of FIG. 2 between 0~6500 seconds.

A measuring mechanism (not shown) is provided to measure the concentration of sodium ions ($Na^+$) and chlorine ions ($Cl^-$) in the outputs from the chambers 42 and 44. In this measuring mechanism, the conductivity is used to indicate the solution concentration. It is understood to the skilled in this art that the conductivity of 800 ppm NaCl solution approximates to 1.6 milli Siemens per centimeter (mS/cm). The measurement results from the measuring mechanism show that the conductivities of the chamber 42 and chamber 44 are respectively around 1.5 mS/cm and 1.7 mS/cm in the first phases and around 1.7 mS/cm and 1.5 mS/cm in the second phases. FIG. 3 shows a portion of the measurement results of the output from the chamber 42, which demonstrates that the chamber 42 is alternatively operated in the charge mode and the discharge mode. Therefore, it is concluded that the SCD device 10 continually produces both of the dilute and concentrated solutions in entire treating process.

It is readily understood that more than one bipolar electrode 16 may be disposed between the terminal electrodes 12 and 14 such that more chambers are formed to treat multiple feed streams for obtaining improved production capacity. The bipolar electrodes in one example are divided into two groups. Each of the bipolar electrodes in the first group has a cation exchange material disposed on opposing surfaces thereof Each of the bipolar electrodes in the second group has an anion exchange material disposed on opposing surfaces thereof.

Figure 4:
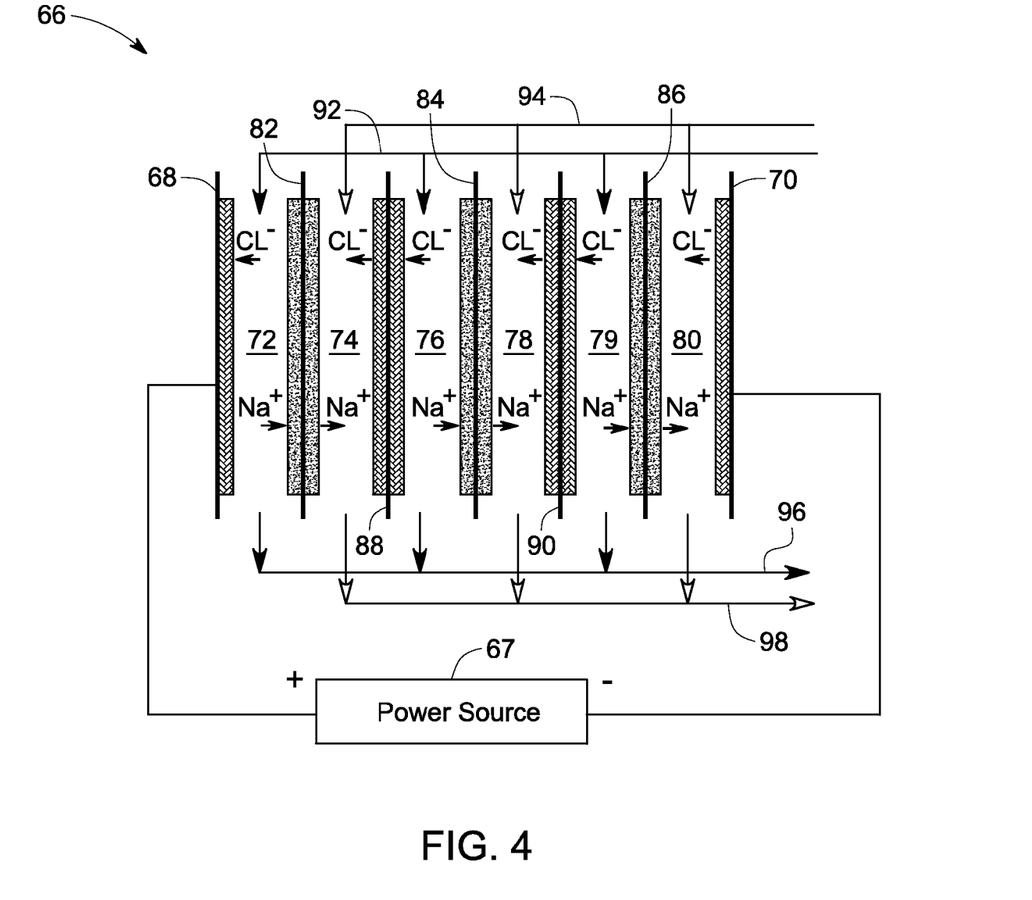
FIG. 4 is a schematic diagram of a SCD system in a first phase in one embodiment.

FIG. 4 illustrates a SCD system 66 with multiple bipolar electrodes in accordance with another embodiment. The SCD system 66 includes a SCD device (not labeled) and a power source 67 for providing opposite polarities to the SCD device. The SCD device includes a pair of terminal electrodes 68 and 70, five bipolar electrodes and six chambers 72, 74, 76, 78, 79 and 80 between the terminal electrodes 68 and 70 and the bipolar electrodes.

In the example shown in FIG. 4, the bipolar electrodes include three first bipolar electrodes 82, 84 and 86 each having a cation exchange material (not labeled) disposed on opposing surfaces thereof and two second bipolar electrodes 88 and 90 each having an anion exchange material (not labeled) on opposing surfaces thereof The first bipolar electrodes 82, 84 and 86 and the second bipolar electrodes 88 and 90 are alternatively disposed between the terminal electrodes 68 and 70.

The terminal electrodes 68 and 70 may be any embodiments above-mentioned. In one embodiment, the two terminal electrodes 68 and 70 have an ion exchange material on one surface thereof It should be noted that the amount of the bipolar electrodes impacts the choice for the cation or anion exchange material on the terminal electrodes 68 and 70. For example, if the first and second bipolar electrodes have the same amount, one terminal electrode 68 or 70 has the cation exchange material, and the other has the anion exchange material thereon. Otherwise, both of the terminal electrodes 68 and 70 may have the cation exchange material or both have the anion exchange material.

In the example shown in FIG. 4, both of the terminal electrodes 68 and 70 have an anion exchange material on one surface thereof The first bipolar electrodes 82, 84 and 86 have a cation exchange material disposed on opposing surfaces thereof, while the second bipolar electrodes 88 and 90 have an anion exchange material disposed on opposing surfaces thereof When the terminal electrodes 68 and 70 are supplied with opposite polarities as FIG. 4 shown, the chambers 72, 76 and 79 become dilute chambers and the chambers 74, 78 and 80 become concentrated chambers. In other words, feed streams passing through the chambers 72, 76 and 79 become dilute solutions, and the feed streams passing through the chambers 74, 78 and 80 become concentrated solutions.

The water to be diluted is defined as a dilute feed stream, and the water to be concentrated is defined as a concentrated feed stream for convenient description herein. Referring to FIG. 4, three dilute feed streams 92 coming from one feed tank (not shown) are introduced into the chambers 72, 76 and 79 for treatment, and three concentrated feed streams 94 are introduced into the chambers 74, 78 and 80 for treatment. During the treatment, the dilute feed streams passing through the chambers 72, 76 and 79, ions such as the chlorine ($Cl^-$) and sodium ($Na^+$) contained in the dilute feed streams 92 are absorbed onto the associated ion exchange material or/and the electrodes under the electric field. Then three dilute solution streams 96 are discharged out of the chambers 72, 76 and 79. In the chambers 74, 78 and 80, the ions such as the chlorine ($Cl^-$) and sodium ($Na^+$) contained ion exchange material or/and the electrodes are depleted into the concentrated feed streams 94 forming concentrated solution streams 98 under the electric field.

Figure 5:
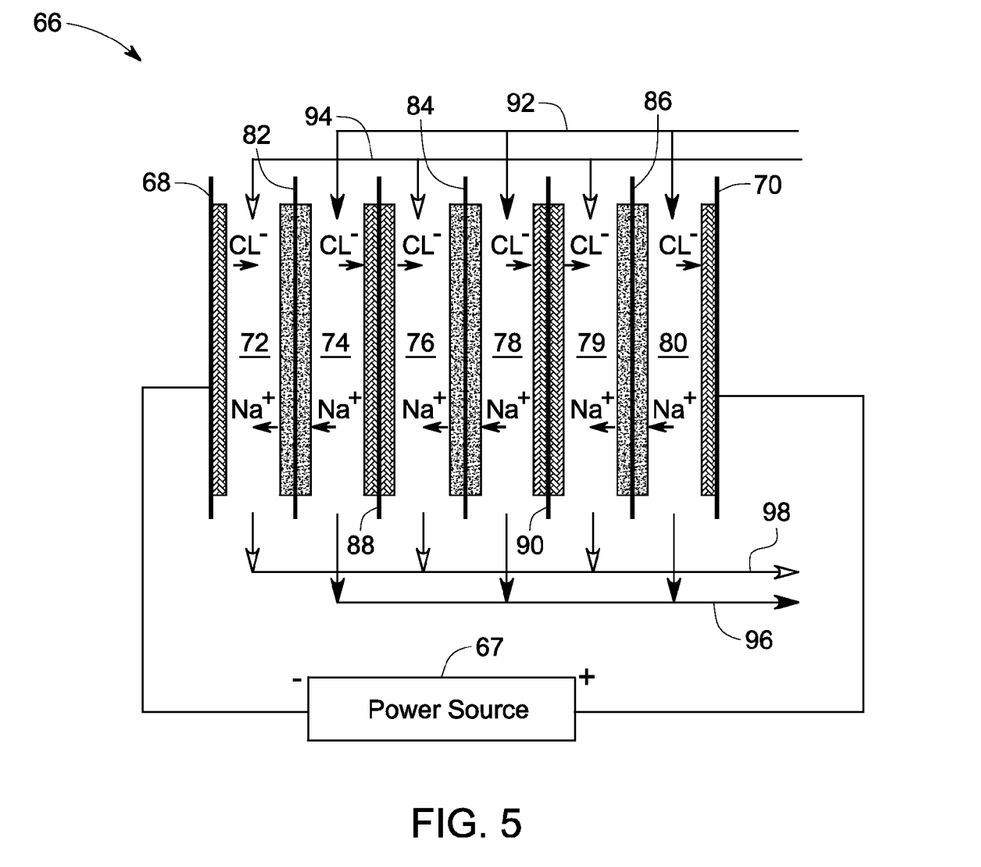
FIG. 5 is a schematic diagram of the SCD system of FIG. 4 in the second phase.

The SCD device has a similar operation with the SCD device 10 of FIG. 1, and also need to alternatively work in a first phase and a second phase for the capacity limitation of the electrodes by periodically switching the opposite polarities from the power source 67. FIG. 4 shows the SCD device is operated in the first phase, and FIG. 5 shows the SCD system 66 is operated in the second phase. During operation according to one example, the dilute and concentrated feed streams 92 and 94 need to be switched along with the switch of the first phase and the second phase. As a result, in the second phase, the dilute solution streams 96 are discharged from the chambers 74, 78 and 80, while the concentrated solution streams 98 are discharged from the chambers 72, 76 and 79. Using the SCD system 66, the dilute solution and the concentrated solution are continuously produced.

It should be pointed out that the electrodes including the terminal electrodes and the bipolar electrodes in the SCD system 66 may be any embodiments above-mentioned. The chlorine ions (Cl$^-$) and the sodium ions (Na$^+$) are only examples shown in FIGS. 4 and 5, feed streams containing other kinds ions also may be treated using the SCD system 66.

Figure 6:
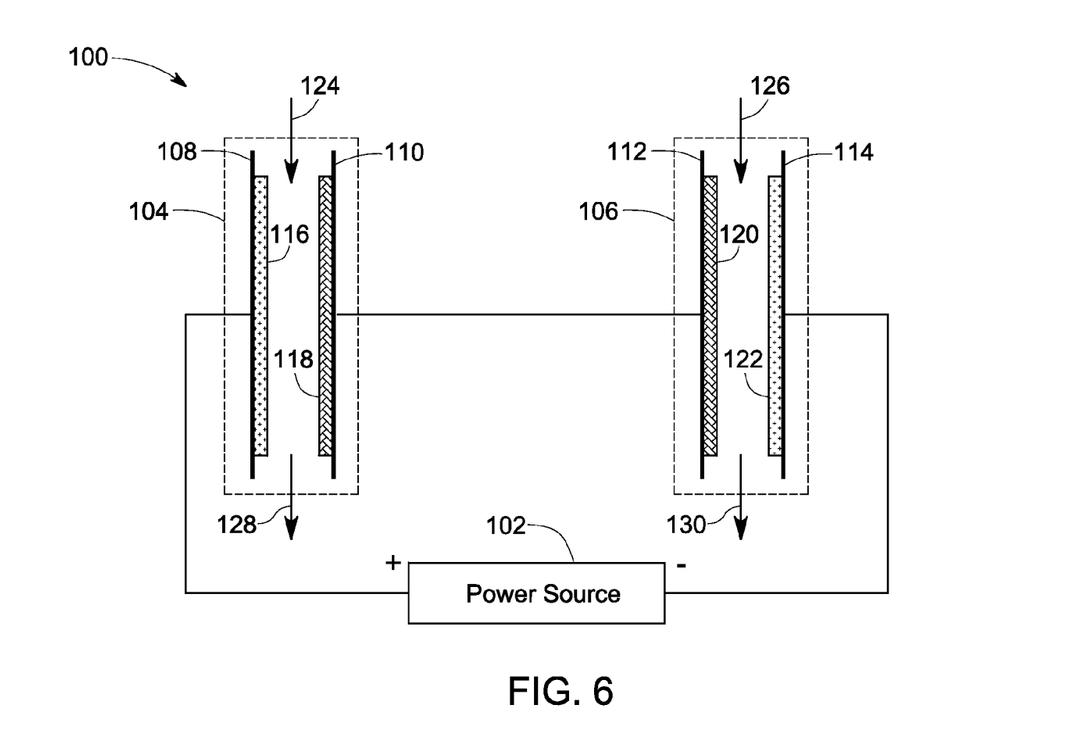
FIG. 6 is a schematic diagram of a SCD system in another embodiment.

FIG. 6 illustrates a SCD system 100 in accordance with still another embodiment. The SCD system 100 includes a power source 102 and two SCD stacks 104 and 106. The power source 102 is configured to provide a predetermined voltage or current to enable the SCD stacks 104 and 106 to be operated under an electric field. It is readily understood that the SCD system may includes more than two SCD stacks according to the production capacity requirement. In the example shown in FIG. 6, each SCD stack 104, 106 includes two single electrodes 108, 110, 112 and 114 with ion exchange material 116, 118, 120 and 122 on one surface thereof. The ion exchange material 116, 118, 120 and 122 may be an anion exchange material or a cation exchange material. The single electrodes 110, 112 with the same kind of the ion exchange material are electrically connected together, and the rest two single electrodes 108, 114 are connected with the anode and cathode of the power source 102. In this example, the single electrodes 108 and 114 have the anion exchange material 116 and 122 disposed on one surface thereof, and the single electrodes 110 and 112 have the cation exchange material 118 and 120 disposed on one surface thereof. Furthermore, the single electrodes 110 and 112 are connected in series, and the single electrodes 108 and 114 functioning as terminal electrodes are respectively coupled to an anode and a cathode of power source 102 during operation.

In operation according to the example of FIG. 6, the SCD stack 104 is in a charge mode, while the SCD stack 106 is in a discharge mode. When the feed streams 124 and 126 are respectively passing through the SCD stacks 104 and 106, anions and cations (not shown) in the feed stream 124 are absorbed by the anion exchange material 116 and the cation exchange material 118 or/and the single electrodes 108, 110 (charge process) under the electric field and then a dilute solution 128 is discharged out of the SCD stack 104. While in the SCD stack 106, anions and cations contained in the cation exchange material 120, the anion exchange material 122 or/and the single electrodes 112 and 114 are depleted into the feed stream 126 (discharge process) under the electric field, thereby forming a concentrated solution 130.

When the anion exchange material 116, the cation exchange material 118 or/and the single electrodes 108 and 110 are saturated or nearly saturated, the opposite polarities are reversed to enable the SCD system 100 to be operated under a new electric field opposite to the former one. At this time, the feed streams 124 and 126 are switched according to the reverse of the polarities. As a result, the dilute solution 128 is discharged out of the SCD stack 106, while the concentrated solution 130 is discharged out of the SCD stack 104.

In the SCD system 100, the discharge and charge modes co-exist in entire treating process, therefore, the dilute solution 128 and concentrated solution 130 are both continuously produced as long as switching the feed streams according to the reverse of the opposite polarities.

Referring to FIG. 6, as mentioned above, the discharge and charge modes are combined in the single SCD system 100. In the discharge mode of the stack 106, ions contained in the single electrode 112 in one example are depleted into the feed stream 126, while the electrons matched with the ions transfer into the single electrode 110 of the SCD stack 104 via the conductive connection. The SCD system 100 decreases the overall energy consumption by the energy regeneration in one single system.

In one embodiment, the SCD system 100 has more than two SCD stacks connected together to meet the practical application. Each SCD stack has the similar configuration as either of the SCD stacks 104 and 106. In this example, adjacent pairs of single electrodes such as 110 and 112 are electrically connected via wires or other kinds of electrical elements.

In one embodiment, each SCD stack further includes at least one bipolar electrode between the single electrodes 108, 110, 112 and 114 forming a plurality of chambers in one SCD stack. In another embodiment, each of the bipolar electrodes has an ion exchange material disposed on opposing surfaces thereof In a further embodiment, the SCD stack with more than one chamber may be configured to be any of the above-mentioned embodiments of the SCD devices such as 10 in FIG. 1 and 66 in FIG. 4.

In some applications, at least one SCD stack is configured to have at least one bipolar electrode. The at least one bipolar electrode has a cation exchange material on one surface thereof and has an anion exchange material on the other surface thereof With such configuration, the chambers in the one SCD stack are all in the discharge mode or the charge mode.

It should be noted that "a" and "an" used to modify uncountable term herein are intended to specially indicate the term is first mentioned in individual sections rather than limit the term's amount.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for super-capacitor desalination, comprising:
providing a super-capacitor desalination (SCD) device comprising:
a pair of terminal electrodes,
a plurality of SCD stacks each comprising a plurality of single electrodes wherein at least two adjacent single electrodes in different SCD stacks are electrically connected in series to form at least one bipolar electrode, the at least one bipolar electrode being between the terminal electrodes, the first of the two electrically connected adjacent single electrodes having the ion exchange material disposed on a surface that faces away from the second of the two electrically connected adjacent single electrodes, and the second of the two electrically connected adjacent single electrodes having the ion exchange material disposed on a surface that faces away from the first of the two electrically connected adjacent single electrodes; and a plurality of chambers formed between the terminal electrodes and the at least one bipolar electrode;

the ion exchange material being a cation exchange material or an anion exchange material;

supplying opposite polarities to the terminal electrodes to generate an electric field therebetween; introducing a plurality of feed streams into the chambers;

simultaneously producing at least one dilute solution in a first chamber and at least one concentrated solution in a second chamber;

periodically reversing the opposite polarities to the terminal electrodes; and periodically switching the introduced feed streams for continuously producing the at least one dilute solution in the second chamber and the at least one concentrated solution in the first chamber.

2. The method of claim 1, wherein the step of providing a plurality of SCD stacks comprises implanting the ion exchange material into the at least one bipolar electrode.

3. The method of claim 1, wherein the step of providing a plurality of SCD stacks comprises coating the ion exchange material on the opposing surfaces of the at least one bipolar electrode.

4. A method for super-capacitor desalination, comprising:
providing a super-capacitor desalination (SCD) device comprising:
a pair of terminal electrodes,
a plurality of first bipolar electrodes each having a cation exchange material disposed on opposing surfaces thereof; and
a plurality of second bipolar electrodes each having an anion exchange material disposed on opposing surfaces thereof;
the plurality of first and second bipolar electrodes being between the terminal electrodes, a plurality of chambers formed between the terminal electrodes and the plurality of first and second bipolar electrodes;

supplying opposite polarities to the terminal electrodes to generate an electric field therebetween;

introducing a plurality of feed streams into the chambers;

simultaneously producing at least one dilute solution in a first chamber and at least one concentrated solution in a second chamber;

periodically reversing the opposite polarities to the terminal electrodes; and periodically switching the introduced feed streams for continuously producing the at least one dilute solution in the second chamber and the at least one concentrated solution in the first chamber.

5. The method of claim 4, comprising alternatively arranging the first bipolar electrodes and the second bipolar electrodes between the terminal electrodes.

6. The method of claim 4, wherein the step of providing a SCD device comprises implanting the ion exchange material into the at least one of the bipolar electrodes.

7. The method of claim 4, wherein the step of providing a SCD device comprises coating the ion exchange material on the opposing surfaces of at least one of the bipolar electrodes.

* * * * *